United States Patent [19]

Satake et al.

[11] Patent Number: 4,975,479
[45] Date of Patent: * Dec. 4, 1990

[54] HEAT-RESISTANT THERMOPLASTIC RESIN COMPOSITION

[75] Inventors: Yoshikatsu Satake, Iwaki; Shinji Yamamoto, Urawa; Takashi Kaneko, Tokyo; Masahito Tada, Matsudo; Ken Kashiwadate, Iwaki; Toshiya Mizuno, Tsuchiura; Hiroyuki Endo, Chiyoda; Takayuki Katto, Iwaki; Zenya Shiiki, Narashino, all of Japan

[73] Assignee: Kureha Kagaku Kogyo K.K., Japan

[*] Notice: The portion of the term of this patent subsequent to Oct. 2, 2007 has been disclaimed.

[21] Appl. No.: 424,637

[22] Filed: Oct. 20, 1989

[30] Foreign Application Priority Data

Oct. 25, 1988 [JP] Japan .................................. 63-267290
Nov. 15, 1988 [JP] Japan .................................. 63-286836
Sep. 26, 1989 [JP] Japan .................................. 1-248084

[51] Int. Cl.$^5$ .................. C08K 5/35; C08J 283/00; C08G 14/00
[52] U.S. Cl. .................................. 524/100; 524/103; 524/106; 524/128; 524/323; 524/334; 524/396; 524/405; 524/592; 525/471; 525/537; 264/288.4; 264/290.2
[58] Field of Search .................. 525/471, 537; 524/100, 524/126, 128, 103, 323, 334, 405, 396, 592; 264/288.4, 290.2

[56] References Cited

U.S. PATENT DOCUMENTS

| | | | |
|---|---|---|---|
| 4,590,104 | 5/1986 | Zeiner et al. | 427/389.9 |
| 4,690,972 | 9/1987 | Johnson et al. | 528/388 |
| 4,698,415 | 10/1987 | Sinclair et al. | 528/226 |
| 4,716,212 | 12/1987 | Gaughan et al. | 528/226 |
| 4,745,167 | 5/1988 | Iizuka et al. | 528/226 |
| 4,826,906 | 5/1989 | Satake et al. | 528/226 |
| 4,873,283 | 10/1989 | Satake et al. | 524/520 |
| 4,886,871 | 12/1989 | Satake et al. | 528/22.6 |
| 4,895,892 | 1/1990 | Satake et al. | 524/520 |
| 4,895,893 | 1/1990 | Satake et al. | 524/592 |
| 4,895,912 | 1/1990 | Satake et al. | 525/471 |
| 4,895,924 | 1/1990 | Satake et al. | 528/226 |
| 4,895,925 | 1/1990 | Satake et al. | 528/226 |
| 4,897,238 | 1/1990 | Satake et al. | 264/288.4 |

FOREIGN PATENT DOCUMENTS

| | | |
|---|---|---|
| 270955 | 6/1988 | European Pat. Off. . |
| 274754 | 7/1988 | European Pat. Off. . |
| 280325 | 8/1988 | European Pat. Off. . |
| 3405523 | 8/1985 | Fed. Rep. of Germany . |
| 42-13347 | 7/1972 | Japan . |
| 60-58435 | 4/1985 | Japan . |
| 60-104126 | 6/1985 | Japan . |
| 61-221229 | 10/1986 | Japan . |

OTHER PUBLICATIONS

*Indian J. Chem.,* vol. 21A, May 1982, pp. 501–502.
*Indian Journal of Pure and Applied Physics,* vol. 22, Apr. 1984, *Mol. Cryst. Liq. Cryst.,* vol. 83, 1982, pp. 229–238.

Primary Examiner—Morton Foelak
Attorney, Agent, or Firm—Lowe, Price, LeBlanc, Becker & Shur

[57] ABSTRACT

Disclosed herein are melt-stable thermoplastic resin compositions comprising (A) 100 parts by weight of a particular poly(arylene thioether) block copolymer, (B) —400 parts by weight of at least one of thermoplastic resins, and (C) 0–400 parts by weight of at least one filler per 100 parts by weight of the resin components. At least either one of Component (B) and Component (C) is contained in a proportion of at least 0.1 part by weight per 100 parts by weight of Component (A). The poly(arylene thioether) block copolymer alternately comprise at least one poly(arylene thioether-ketone) block having predominant recurring units of the formula

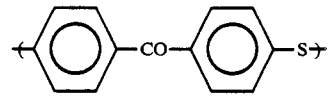

wherein the —CO— and —S— are in the para position to each other and at least one poly(arylene thioether) block having predominant recurring units of the formula

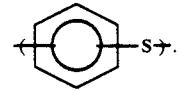

Also disclosed are compositions obtained by stabilizing by the melt-stable thermoplastic resin compositions with a basic compound and products molded or formed product from these compositions.

15 Claims, No Drawings

HEAT-RESISTANT THERMOPLASTIC RESIN COMPOSITION

FIELD OF THE INVENTION

This invention relates to a novel poly(arylene thioether) block copolymer composition, said block copolymer containing poly(arylene thioether-ketone) blocks and poly(arylene thioether) blocks, and more specifically to a composition composed of the block copolymer and at least one of thermoplastic resins and/or various fillers, having a high melt stability sufficient to permit application of conventional melt processing techniques and capable of providing heat resistant molded or formed products.

This invention is also concerned with a block copolymer composition containing a specific stabilizer and having still improved melt stability.

In addition, this invention also pertains to molded or formed products made of these block copolymer compositions.

BACKGROUND OF THE INVENTION

In the fields of the electronic and electrical industry and the automobile, aircraft and space industries, there is a strong demand in recent years for crystalline thermoplastic resins having high heat resistance of about 300.C or higher in terms of melting point and moreover easy melt processability.

Recently, poly(arylene thioether-ketones) (hereinafter abbreviated as "PTKs") have drawn attention for their high melting points. Various studies are now under way thereon.

There are some disclosure on PTKs, for example, in Japanese Patent Laid-Open No. 58435/1985, German Offenlegungsschrift 34 05 523 Al, Japanese Patent Laid-Open No. 104126/1985, Japanese Patent Laid-Open No. 13347/1972, Indian J. Chem., 21A, 501–502 (May, 1982), Japanese Patent Laid-Open No. 221229/1986, U.S. Pat. Specification No. 4,716,212, U.S. Pat. Specification No. 4,690,972, European Patent Publication No. 0,270,955 A2, European Patent Publication No. 0,274,754 A2, European Patent Publication No. 0,280,325 A2, etc.

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

The present inventors thus conducted an investigation with a view toward developing a process for economically producing PTKs having melt stability sufficient to permit the application of conventional melt processing techniques. The investigation led to the successful provision of PTKs having significantly improved heat stability upon melting (hereinafter called "melt stability") (Japanese Patent Laid-Open No. 54031/1989).

It has also found that the melt stability of the melt-stable PTKs upon melt processing can be improved further by the addition of a basic compound such as the hydroxide or oxide of a Group IA or Group IIA metal of the periodic table to them (Japanese Patent Application No. 142772/1988).

The melt-stable PTKs obtained as described above have a high melting point, typified by the extremely high melting point of the homopolymer which reaches as high as about 360° C. This is however not all good. Their melt processing temperatures are high accordingly, so that melt processing facilities for high-temperature processing are required. Further, a stringent temperature control is required to perform melt processing without deterioration by heat.

The melt-stable PTKS are generally obtained as fine powders having a particle size of approximately 5–20 μm. This has led to an additional problem upon their production such that they show poor handling properties in their collection step after polymerization, especially in filtration, washing, drying and transportation. Still further problems have also arisen such as poor metering property upon melt processing and occurrence of blocking in hoppers or the like.

OBJECTS AND SUMMARY OF THE INVENTION

An object of this invention is to obtain novel copolymers with improved processability and handling properties while retaining the excellent properties, such as heat resistance and crystallinity, of the aforementioned melt-stable PTKs as much as possible and also to provide resin compositions having excellent heat resistance by using these copolymers.

Another object of this invention is to provide resin compositions improved still further in melt stability.

A further object of this invention is to provide molded or formed products made of such resin compositions.

The present inventors then attempted to produce a PTK-PATE block copolymer in which a poly(arylene thioether) (hereinafter abbreviated as "PATE") having recurring units of the formula

is incorporated as blocks in the chain of a melt-stable PTK. As a result, it has been found that a poly(arylene thioether) block copolymer having excellent processability and high crystallinity can be obtained by using as a prepolymer a PATE, which has a particular average polymerization degree and contains terminal thiolate groups and/or thiol groups as reactive terminal groups, and reacting the PATE prepolymer with a 4,4'-dihalobenzophenone and an alkali metal sulfide under specific conditions in an organic amide solvent.

It has also been found that a block copolymer having excellent properties can be obtained by reacting a PATE prepolymer with a PTK prepolymer under specific conditions in an organic amide solvent.

It has also been uncovered that each of these block copolymers can be obtained as granules having good handling properties from its polymerization systems by a conventional collection method.

It has also been revealed that the block copolymers have high melt stability upon melting and formed or molded products such as extruded products, injection-molded products or unstretched films can hence be obtained easily by conventional melt processing techniques from compositions obtained by blending the block copolymers with at least one of thermoplastic resins and/or various fillers.

It has also been found that compositions improved still further in melt stability and crystallinity reduction and improved in problems such as sticking of thermal decomposition products to resin residence areas of melt processing equipment can be obtained by adding a specific basic compound, optionally along with an anti-oxidant, to the above block copolymer compositions.

The present invention has been brought to completion on the basis of these findings.

In one aspect of this invention, there is thus provided a melt-stable thermoplastic resin composition comprising:

(A) 100 parts by weight of a poly(arylene thioether) block copolymer (Component A) alternately comprising (X) at least one poly(arylene thioetherketone) block having predominant recurring units of the formula

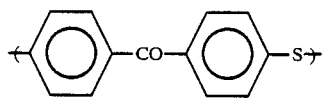

wherein the —CO— and —S— are in the para position to each other and (Y) at least one poly(arylene thioether) block having predominant recurring units of the formula

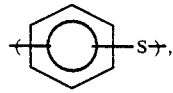

(a) the ratio of the total amount of the poly(arylene thioether) block (Y) to the total amount of the poly(arylene thioether-ketone) block (X) ranging from 0.05 to 5 by weight, (b) the average polymerization degree of the (arylene thioether) block (Y) being at least 10, and (c) said block copolymer having a melt viscosity of 2–100,000 poises as measured at 350° C. and a shear rate of 1,200/sec;

(B) 0–400 parts by weight of at least one of thermoplastic resins (Component B); and (C) 0–400 parts by weight of at least one filler (Component C) selected from fibrous fillers and inorganic fillers, per 100 parts by weight of the resin components [Component A + Component B], at least either one of Component B and Component C being contained in a proportion of at least 0.1 part by weight per 100 parts by weight of Component A.

In a further aspect of this invention, there is also provided a melt-stable thermoplastic resin composition as described above, wherein per 100 parts by weight of the poly(arylene thioether) block copolymer (Component A), 0.1–30 parts by weight of at least one basic compound (Component D) selected from the group consisting of hydroxides, oxides and aromatic carboxylates of group IIA metals of the periodic table other than magnesium, and aromatic carboxylates, carbonates, hydroxides, phosphates, including condensation products, and borates, including condensation products, of group IA metals of the periodic table and 0–10 parts by weight of at least one anti-oxidant(Component E) selected from the group consisting of hindered phenolic compounds, phosphorus compounds and hindered amine compounds.

In a still further aspect of this invention, there is also provided formed or molded products, such as extruded products, injection molded products and unstretched films, made of the above-described resin compositions.

DETAILED DESCRIPTION OF THE INVENTION

Features of the present invention will hereinafter be described in detail.

Poly(Arylene Thioether) Block Copolymer

[Chemical structure of block copolymers]

The poly(arylene thioether) block copolymers according to the present invention are block copolymers alternately comprising (X) at least one PTK block having predominant recurring units of the formula

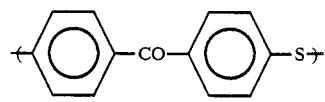

wherein the —CO— and —S— are in the para position to each other and (Y) at least one PATE block having predominant recurring units of the formula

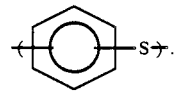

The block copolymer of the present invention can have a desired structure containing both blocks in an alternate order, such as (X)-[(Y)—(X)]$_m$(Y)—(X), m being 0 or an integer of 1 or greater or (X)-[(Y)—(X)]$_n$(Y), n being 0 or an integer of 1 or greater.

It is however required that the weight ratio of the total amount of blocks (Y) to the total amount of blocks (X) be within a range of 0.05–5, preferably 0.1–4, more preferably 0.15–3.

The block (X) serves to impart high degrees of heat resistance and crystallinity to the block copolymer. On the other hand, the block (Y) contributes to the reduction of the processing temperature and the granulation while maintaining the high crystallinity. Therefore, any weight ratios of the total amount of blocks (Y) to the total amount of blocks (X) smaller than 0.05 are too small to achieve any sufficient reduction in processing temperature or the granulation. To the contrary, any ratios greater than 5 lead to a substantial reduction in heat resistance and disturb the balancing between heat resistance and processability. Ratios outside the above range are therefore not preferred.

It is essential for the block (Y) to have an average polymerization degree of at least 10, preferably 20 or higher.

If the average polymerization degree of the block (Y) is smaller than 10, the resulting block copolymer becomes similar to a random copolymer so that physical properties such as crystallinity, heat resistance and melt stability are all reduced substantially. Such small average polymerization degrees are therefore not preferred. In addition, any unduly small average polymerization degree of the block (Y) leads to another problem that a block copolymer of high molecular weight can hardly be obtained.

The block (X) and block (Y) can contain one or more recurring units other than their predominant recurring units of the formulae

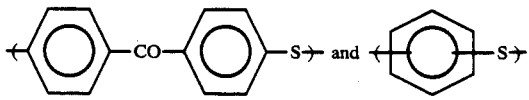

to an extent that the objects of this invention are not impaired.

Exemplary recurring units other than the above recurring units may include:

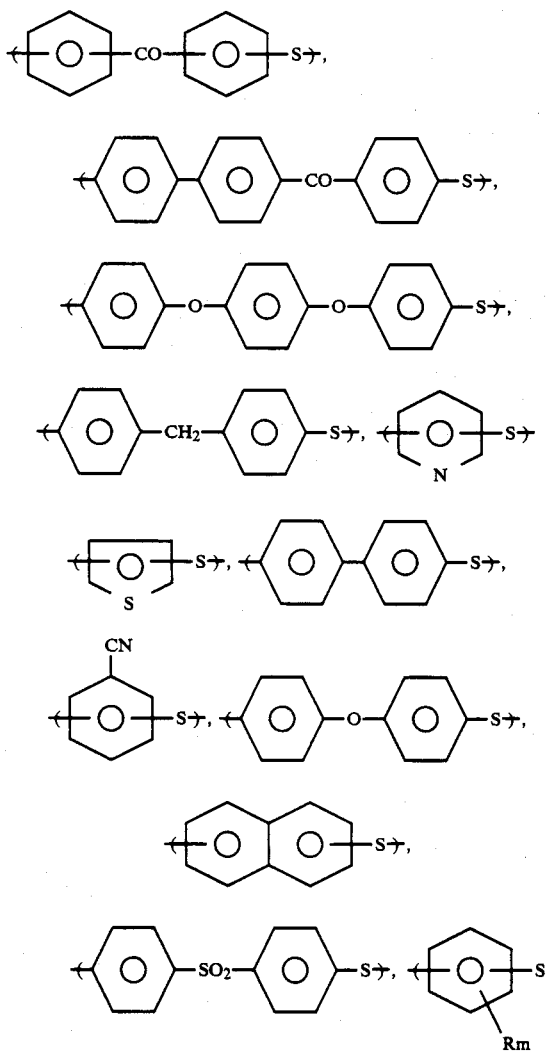

(wherein R means an alkyl group having 5 or less carbon atoms and m stands for an integer of 0–4.).

In general, these other recurring units can be introduced into the block copolymers by using the corresponding various dihalogenated aromatic compounds as comonomers.

[Physical properties of the block copolymers]

Physical properties and other characteristics of the poly(arylene thioether) block copolymers according to this invention will next be described in detail from the viewpoint of processability, melt stability, crystallinity and the like.

(1) Processability:

The melting point of PTK homopolymer is about 360° C. The extent of a reduction in the melting point due to copolymerization with another monomer of a different kind, $\Delta Tm = [360°\ C. - Tm$ (melting point of copolymer)] is generally proportional to the extent of a reduction in the melt processing temperature. Accordingly, $\Delta Tm$ can be used as an index indicative of processing temperature reducing effect, namely, processability improving effect.

$\Delta Tm$ may preferably be 10°–80° C., more preferably 20°–70° C., most preferably 30°–60° C. If $\Delta Tm$ is lower than 10° C., there is a potential problem that the processability improving effect may not be sufficient. If $\Delta Tm$ is higher than 80° C., there is another potential problem that the block copolymer may lose the characteristics as a heat-resistant resin. $\Delta Tm$ outside the above range is therefore not preferred.

(2) Crystallinity:

One of great features of the block copolymers according to this invention resides in that they have not only excellent processability but also high crystallinity. Crystallinity imparts high heat resistance to a copolymer. To have a block copolymer equipped with high heat resistance, it is essential that the block copolymer has sufficient crystallinity.

In general, melt crystallization enthalpy $\Delta Hmc$ is proportional to the degree of crystallization when a molten polymer undergoes crystallization. On the other hand, melt crystallization temperature $Tmc$ serves as an index of the readiness of crystallization. Therefore, the melt crystallization enthalpy $\Delta Hmc$ (400° C.) and melt crystallization temperature $Tmc$ (400° C.) of a block copolymer according to this invention as measured when cooled at a rate of 10° C./min immediately after being heated to 400° C in an inert gas atmosphere by means of a differential scanning calorimeter (hereinafter abbreviated as "DSC") can be used as indices of the crystallinity of the block copolymer.

In addition, residual melt crystallization enthalphy, $\Delta Hmc$ (400° C./10 min) and melt crystallization temperature, $Tmc$ (400° C./10 min) measurable upon determination of the residual crystallinity, both of which will be described subsequently, can be used as an index of not only melt stability but also crystallinity.

The block copolymers of this invention may have a melt crystallization enthalpy, $\Delta Hmc$ (400° C.) of at least 15 J/g, preferably at least 20 J/g, and more preferably at least 25 J/g. On the other hand, $Tmc$ (400° C.) may desirably be at least 180° C., with at least 200° C. being more preferred. Block copolymers having $\Delta Hmc$ (400° C.) smaller than 15 J/g or $Tmc$ (400° C.) lower than 180° C. may have insufficient heat resistance as heat resistant polymers and are hence not preferred.

(3) Melt stability:

The greatest feature of the block copolymers according to this invention resides in that they have melt stability sufficient to permit the application of conventional melt processing techniques.

Polymers of poor melt stability tend to lose their crystallinity or to undergo crosslinking or carbonization, resulting in a rapid increase in melt viscosity, upon melt processing.

It is hence possible to obtain an index of the melt processability of a polymer by investigating the residual crystallinity of the polymer after holding it at an elevated temperature of its melt processing temperature or higher for a predetermined period of time. The residual crystallinity can be evaluated quantitatively by measuring the melt crystallization enthalpy of the polymer by a DSC.

Specifically, it is possible to use as indices of the melt stability of a block copolymer its residual melt crystallization enthalphy, $\Delta Hmc$ (400° C./10 min) and melt crystallization temperature, $Tmc$ (400° C./10 min), which are determined at a cooling rate of 10° C./min after the block copolymer is held at 50° C. for 5 minutes in an inert gas atmosphere, heated to 400° C. at a rate of 75.C/min and then held for 10 minutes at 400.C which is higher than the melt processing temperature of the block copolymer.

In the case of a copolymer having poor melt stability, it undergoes crosslinking or the like under the above conditions, namely, when it is held for 10 minutes at the high temperature of 400° C., whereby the copolymer loses its crystallinity substantially.

The block copolymers of this invention are polymers having the physical properties that their residual melt crystallization enthalpies, $\Delta Hmc$ (400° C./10 min) are at least 10 J/g, more preferably at least 15 J/g, most preferably at least 20 J/g and their melt crystallization temperatures, $Tmc$ (400° C./10 min) are at least 170° C., more preferably at least 180° C., most preferably at least 190° C.

A block copolymer, whose $\Delta Hmc$ (400° C./10 min) is smaller than 10 J/g or whose $Tmc$ (400° C./10 min) is lower than 170° C., tends to lose its crystallinity or to induce a melt viscosity increase upon melt processing, so that difficulties are encountered upon application of conventional melt processing techniques.

Further, the ratio of melt crystallization enthalpy to residual melt crystallization enthalpy, namely, $\Delta Hmc$ (400° C.)/$\Delta Hmc$ (400° C./10 min) can also be used as an index of melt stability. Deterioration by heat becomes smaller as this ratio decreases. Therefore, it is preferable that $\Delta Hmc$ (400° C./10 min) is at least 10 J/g and the above ratio is 5 or smaller, more preferably 3 or smaller.

(4) Melt viscosity:

In this invention, the melt viscosity $\eta^*$ of each copolymer is used as an index of its molecular weight.

Specifically, a polymer sample is filled in a Capirograph manufactured by Toyo Seiki Seisaku-Sho, Ltd. and equipped with a nozzle having an inner diameter of 1 mm and an L/D ratio of 10/1 and is preheated at 350° C. for 5 minutes. Its melt viscosity $\eta^*$ is measured at a shear rate of 1,200/sec.

The block copolymers of the present invention have a melt viscosity $\eta^*$ of 2–100,000 poises, preferably 5–50,000 poises, more preferably 10–30,000 poises.

Those having a melt viscosity $\eta^*$ lower than 2 poises have an unduly small molecular weight so that their flowability is too high to apply conventional melt processing techniques. Even if melt-formed or melt-molded products are obtained, their physical properties are considerably inferior. Such low melt viscosities are therefore not preferred. On the other hand, those having a melt viscosity $\eta^*$ higher than 100,000 poises have an unduly large molecular weight so that their flowability is too low to apply conventional melt processing techniques. Such high melt viscosities are therefore not preferred either.

Production Process of Block Copolymers

Processes for the production of the block copolymers include:

(1) addition of a dihalogenated aromatic compound consisting principally of a 4,4'-dihalobenzophenone and an alkali metal sulfide to PATE blocks (Y) prepared in advance, whereby they are reacted to form PTK blocks (X); and (2) chemical coupling of PTK blocks (X) and PATE blocks (Y), said blocks (X) and (Y) having been prepared separately.

A. Raw materials for block copolymers:

In the process for the production of a block copolymer of this invention, are primarily employed an alkali metal sulfide and a dihalogenated aromatic compound as principal raw materials for the polymer as well as an organic amide solvent and water, including water of hydration, as reaction polymerization media.

(1) Alkali metal sulfide:

Illustrative examples of the alkali metal sulfide useful in the practice of this invention include lithium sulfide, sodium sulfide, potassium sulfide, rubidium sulfide, cesium sulfide and mixtures thereof.

These alkali metal sulfides may each be used as a hydrate or aqueous mixture or in an anhydrous form.

(2) Dihalogenated aromatic compound:

The dihalogenated aromatic compound employed in the present invention for the formation of the PTK block (X), including a PTK prepolymer, consists principally of one or more dihalobenzophenone, i.e., 4,4'-dichlorobenzophenone and/or 4,4'-dibromobenzophenone.

The dihalogenated aromatic compound used for the formation of the PATE block (Y), including a PATE prepolymer, consists principally of a dihalobenzene such as p-dichlorobenzene or m-dichlorobenzene.

As other copolymerizable dihalogenated aromatic compounds, may be mentioned, for example, dihalobenzophenones other than the 4,4'-isomers, dihaloalkylbenzenes, dihalobiphenyls, dihalodiphenyl sulfones, dihalonaphthalenes, bis(halogenated phenyl)methanes, dihalopyridines, dihalothiophenes and dihalobenzonitriles, and mixtures thereof.

It is also permissible to introduce a partially crosslinked and/or branched structure by causing a trihalogenated or higher polyhalogenated compound to exist in a reaction system in such a small amount that the processability and physical properties of the copolymer may not be impaired to any substantial extent.

(3) Organic amide solvent:

As organic amide solvents useful for the present invention, may be mentioned N-methylpyrrolidone, N-ethylpyrrolidone, hexamethylphosphoric triamide, tetramethylurea, dimethylimidazolidinone, dimethylacetamide, a mixed solvent thereof, etc.

B. Polymerization process and reaction conditions:

To prepare the PATE prepolymer in this invention, any process conventionally known for the polymerization of PATE can be adopted. However, for the reaction in which the PTK is formed in the presence of the PATE prepolymer, for the preparation of the PTK prepolymer and for the reaction in which the PTK prepolymer and PATE prepolymer are combined together to form a block copolymer, it is necessary to conduct the reactions under special conditions, namely, by maintaining a high water content in the reaction systems, controlling the monomer compositions suitably, regulating the polymerization temperatures appropriately, and limiting reaction time at high temperatures. It is effective for the production of block copolymers having more preferable physical properties, for example, to choose a suitable material for the reactor and to apply stabilization treatment in a final stage of the reaction.

Unless these reaction conditions are suitably controlled, it is difficult to provide crystalline block copolymers having melt stability suitable for conventional melt processing.

<Preparation processes of prepolymers>

(1) PATE prepolymer:

The PATE prepolymer employed as a raw material for the block copolymer of this invention can be prepared by having an alkali metal sulfide and a dihalogenated aromatic compound, which consists principally of a dihalobenzene, undergo a dehalogenation/sulfuration reaction in the presence of water in an organic amide solvent under the following conditions (a)–(c):

(a) The ratio of the water content to the amount of the charged organic amide solvent is within a range of 0.2–5 (mol/kg), preferably 0.5–4.5 (mol/kg).

(b) The ratio of the amount of the charged dihalogenated aromatic compound to the amount of the charged alkali metal sulfide is within a range of 0.8–1.05 (mol/mol), preferably 0.8–1.0 (mol/mol), more preferably 0.85–0.95 (mol/mol).

(c) The reaction is conducted at a temperature within a range of 200°–280° C., preferably 210°–250° C., and should be continued until the average polymerization degree of the resulting prepolymer reaches at least 10, preferably 20 or greater.

When the ratio of the amount of the charged dihalogenated aromatic compound to the amount of the charged alkali metal sulfide is set at 0.95 or greater (mol/mol), notably, 1.0 or greater (mol/mol) as the above condition (b), the reaction product may be treated further with the alkali metal sulfide to prepare a PATE prepolymer containing more thiolate groups as reactive terminal groups. The PATE prepolymer may contain some crosslinked structure and/or branched structure introduced typically by allowing a trihalobenzene or higher polyhalobenzene to present in a small amount in the polymerization reaction system.

The PATE prepolymer is supposed to be a polymer having an average polymerization degree of at least 10, preferably at least 20 in view of the physical properties required for the block copolymer to be obtained.

In this invention, the number average molecular weight of the PATE block in the stage of the prepolymer is determined by applying the method which relies upon the numbers of terminal thiol groups, thiolate groups and terminal halogen atoms.

Incidentally, it is preferred from the standpoint of reactivity that the ratio of terminal thiolates, including thiol groups if any, to terminal halogen atoms in the PATE prepolymer chain is at least 0.3 (mol/mol), more preferably at least 0.5 (mol/mol). If this ratio is smaller than 0.3, the reactivity at the terminals of the PATE prepolymer is insufficient thereby to make it difficult to obtain a block copolymer.

In passing, among the recurring units of the formula

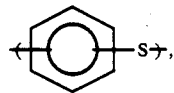

the paraphenylene sulfide unit of the formula

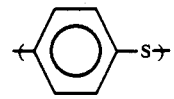

preferred because it can afford block copolymers excellent especially from the viewpoint of crystallinity, melt stability, heat resistance, mechanical properties and the like.

(2) PTK prepolymer:

The PTK prepolymer employed as a raw material for the block copolymer of this invention can be prepared in the following manner.

Namely, the PTK prepolymer can be prepared by having an alkali metal sulfide and a dihalogenated aromatic compound, which consists principally of 4,4'-dichlorobenzophenone and/or 4,4'-dibromobenzophenone, undergo a dehalogenation/sulfuration reaction in the presence of water in an organic amide solvent under the following conditions (a)–(b):

(a) The ratio of the water content to the amount of the charged organic amide solvent is within a range of 2.5–15 (mol/kg).

(b) the reaction si conducted at a temperature within a range of 60°–300° C. with the proviso that the reaction time at 210° C. and higher is not longer than 10 hours.

The PTK prepolymer may contain some crosslinked structure and/or branched structure introduced typically by allowing a trihalobenzophenone or higher polyhalobenzophenone to present in a small amount in the polymerization reaction system.

<Production process of block copolymers (Process No.1)>

As a production process for each block copolymer according to this invention, may be described the process in which a PATE prepolymer is prepared in advance and at least one PTK block is formed in the presence of the PATE prepolymer.

Practically, this process is the following two-step process:

A process for the production of a poly(arylene thioether) block copolymer comprising (X) at least one PTK block and (Y) at least one PATE block, which comprises at least the following two steps:

(i) heating in the presence of water an organic amide solvent containing a dihalogenated aromatic compound, which consists principally of a dihalobenzene, and an alkali metal sulfide, whereby a reaction mixture containing a poly(arylene thioether) prepolymer having predominant recurring units of the formula

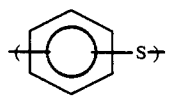

and reactive terminal groups is formed, and (ii) mixing the reaction mixture, which has been obtained in the step i), with a dihalogenated aromatic compound consisting principally of at least one dihalobenzophenone selected from 4,4′-dichlorobenzophenone and 4,4′-dibromobenzo-phenone, an alkali metal sulfide, an organic amide solvent and water and heating the resultant mixture to form a PTK block having predominant recurring units of the formula

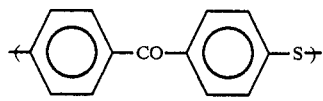

wherein the —CO— and —S— are in the para position to each other, said first and second steps i) and ii) being conducted under the following conditions (a)–(f):

(a) in the first step i), the ratio of the water content to the amount of the charged organic amide solvent being 0.2–5 (mol/kg), the ratio of the amount of the charged dihalogenated aromatic compound to the amount of the charged alkali metal sulfide being 0.8–1.05 (mol/mol), and the polymerization being conducted until the average polymerization degree of the poly(arylene thioether) prepolymer becomes at least 10, (b) in the second step, the ratio of the water content to the amount of the charged organic amide solvent being controlled within a range of 2.5–15 (mol/kg), (c) in the second step, the ratio of the total amount of the charged dihalogenated aromatic compound, said total amount being the amount of the whole dihalogenated aromatic compounds including the dihalobenzene and the dihalobenzophenone, to the total amount of the charged alkali metal sulfide, said latter total amount being the total amount of the alkali metal sulfide charged in the first step i) and that charged in the second step ii), being controlled within a range of 0.95–1.2 (mol/mol), (d) the ratio of the charged amount of the dihalogenated aromatic compound consisting principally of the dihalobenzophenone to the charged amount of the dihalogenated aromatic compound consisting principally of the dihalobenzene being controlled within a range of 0.1–10 (mol/mol), (e) the reaction of the second step (ii) being conducted within a temperature range of 150°–300° C. with the proviso that the reaction time at 210° C. and higher is not longer than 10 hours, and (f) in the second step (ii), the reaction is conducted until the melt viscosity of the resulting block copolymer becomes 2–100,000 poises as measured at 350° C. and a shear rate of 1,200/sec.

<Production process of block copolymers (Process No.2)>

As another production process for each block copolymer according to this invention, may be described the process in which PATE prepolymer and PTK prepolymers are prepared in advance and are then reacted to combine them together. This process is practically the following 3-step process:

A process for the production of a poly(arylene thioether) block copolymer comprising (X) at least one PTK block and (Y) at least one PATE block, which comprises at least the following three steps:

(i) heating in the presence of water an organic amide solvent containing a dihalogenated aromatic compound, which consists principally of a dihalobenzene, and an alkali metal sulfide, whereby a first reaction mixture containing a PATE prepolymer having predominant recurring units of the formula

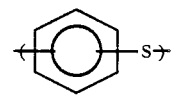

and reactive terminal groups is formed, (ii) heating in the presence of water an organic amide solvent containing a dihalogenated aromatic compound, which consists principally of at least one dihalobenzophenone selected from 4,4′-dichlorobenzophenone and 4,4′-dibromobenzophenone, an alkali metal sulfide, whereby a second reaction mixture containing a PTK prepolymer having predominant recurring units of formula

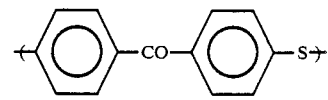

wherein the —CO— and —S— are in the para position to each other and reactive terminal groups is formed, and (iii) mixing and reacting the first reaction mixture, which has been obtained in the first step (i) and contains the PATE prepolymer, with the second reaction mixture obtained in the second step (ii) and containing the PTK prepolymer;

said first through third steps (i)–(iii) being conducted under the following conditions (a)–(g):

(a) in the first step (i), the ratio of the water content to the amount of the charged organic amide solvent being 0.2–5 (mol/kg), the ratio of the amount of the charged dihalogenated aromatic compound to the amount of the charged alkali metal sulfide being 0.8–1.05 (mol/mol), and the polymerization being conducted until the average polymerization degree of the PATE prepolymer becomes at least 10, (b) in the second step, the ratio of the water content to the amount of the charged organic amide solvent being controlled within a range of 2.5–15 (mol/kg) and the reaction being conducted within a temperature range of 60°–300° C. with the proviso that the reaction time at 210° C. and higher is not longer than 10 hours, (c) in the third step, the ratio of the water content to the amount of the charged organic amide solvent being controlled within a range of 2.5–15 (mol/kg), (d) in the third step, the ratio of the total amount of the charged dihalogenated aromatic compound, said total amount being the amount of the whole dihalogenated aromatic compounds including the dihalobenzene and the dihalobenzophenone, to the total amount of the charged alkali metal sulfide, said latter total amount being the total amount of the alkali metal sulfide charged in the first step (i) and that charged in the second step (ii), being controlled within a range of 0.95–1.2 (mol/mol), (e) the ratio of the whole poly(arylene thioether) prepolymer to the whole poly(arylene thioether-ketone) prepolymer being controlled at 0.05–5 by weight, (f) the reaction of the third step iii) being conducted within a temperature range of 150°–300° C. with the proviso that the reaction time at 210° C. and higher is not longer than 10 hours, and (g) in the third step iii), the reaction is conducted until the melt viscosity of the resulting block copolymer becomes 2–100,000 poises as measured at 350° C. and a shear rate of 1,200/sec.

In the process for the production of each of the PTK prepolymer and block copolymer, it is preferable to use, as a reactor (including equipment employed for provisional procedures of the polymerization reaction, for example, those required for dehydration and the like), a reactor made of a corrosion-resistant material at least at portions with which the reaction mixture is brought into direct contact. The corrosion-resistant material is supposed to be inert so that it does not react with the reaction mixture. Preferred examples of the corrosion-resistant material include titanium materials such as titanium and titanium-containing alloys.

Further, in a final stage of the reaction, at least one halogen-substituted aromatic compound having at least one substituent group having electron-withdrawing property at least equal to —CO— group (preferably, 4,4'dichlorobenzophenone and/or 4,4'-dibormobenzophenone employed as a monomer) may be added to the reaction system to react it to the above-obtained block copolymer, whereby a block copolymer improved further in melt stability can be obtained. Here, it should be noted that the term "final stage of the reaction" as used herein means a period after the lapse of about one third of the overall period of the reaction from the initiation thereof. Further, the amount of the halogen-substituted aromatic compound charged in the final stage of the reaction is not included in the above-described amount of the charged dihalogenated aromatic compound.

(Composition)

The composition of the present invention is obtained by blending the poly(arylene thioether) block copolymer (Component A) with at least one of thermoplastic resins (Component B) and at least one fibrous filler and/or inorganic filler (Component C) in order to modify and/or improve various physical properties of the block copolymer, such as mechanical properties, electrical properties, thermal properties and chemical properties, to modify and/or improve its processability and to reduce the cost of the composition. In addition, the composition is also added with a basic compound (Component D) which is a melt stabilizer for Component A, optionally along with an anti-oxidant (Component E).

[Component B . . . Thermoplastic Resin]

Each composition of the present invention may contain as Component B at least one thermoplastic resin in a proportion of 0–400 parts by weight, preferably 0–200 parts by weight, more preferably 0–100 parts by weight, per 100 parts by weight of Component A. If the proportion of Component B exceeds 400 parts by weight, there is a possible problem that in the composition obtained, the advantageous properties of the poly(arylene thioether) block copolymer which is a heat-resistant and crystalline thermoplastic resin could be impaired substantially.

In addition, if the proportion of the filler (Component C) to be blended in the composition is 0 part by weight (namely, the filler is not added at all), Component B should be blended in a proportion of at least 0.1 part by weight per 100 parts by weight of Component A. In this case, when the proportion of Component B is smaller than 0.1 part by weight, Component A will not be modified and/or improved effectively.

As exemplary thermoplastic resins useful as Component B in the present invention, may be mentioned resins such as poly(arylene thioethers), poly(arylene thioether-ketones), aromatic polyether ketones, e.g., PEEKs and PEKs, polyamides (including Aramids), polyamideimides, polyesters (including aromatic polyesters and liquid crystalline polyesters), aromatic polysulfones, e.g., polysulfones and polyether sulfones, polyether imides, polyarylenes, poly(phenylene ethers), polycarbonates, polyester carbonates, polyacetals, fluoropolymers such as polytetrafluoroethylene, polyolefins, polystyrenes, polymethyl methacrylates, and ABS; as well as elastomers such as fluororubbers, silicone rubbers, olefin rubbers, acrylic rubbers, polyisobutylenes (including butyl rubber), hydrogenated SBR, polyamide elastomers and polyester elastomers. These thermoplastic resins may be used either singly or in combination.

Of the above thermoplastic resins, poly(arylene thioethers), particularly poly(arylene thioethers) containing predominant recurring units of the formula

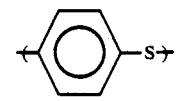

(in a proportion of at least 50 wt.%), poly(arylene thioether-ketones) containing predominant recurring units of the

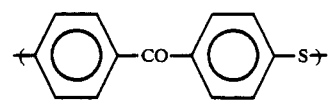

wherein the —CO— and —S— are in the para position to each other, and mixtures thereof show excellent compatibility when blended with the block copolymer of this invention, judging from the glass transition temperature of the blends as measured by a DSC, their crystallization temperatures $Tc_1$ from a glass state, their crystallization temperature $Tc_2$ from a molten state and the peak behaviours of the melting points of their crystals. These compositions have also been found to have the marked feature that they can provide transparent moldings under amorphous conditions when they are free of any filler.

[Component C . . . Filler]

Each composition of the present invention may contain as Component C at least one fibrous filler and/or at least one inorganic filler in a proportion of 0–400 parts by weight, preferably 0–300 parts by weight, more preferably 0–200 parts by weight, per 100 parts by weight of the sum of the resin components (Component A +Component B). If the proportion of Component C exceeds 400 parts by weight, there is a potential problem that the processability may be reduced. Such a large proportion is therefore not preferred.

On the other hand, if the proportion of Component B (thermoplastic resin) is 0 part by weight (namely, the Component B is not added at all), Component C should be blended in a proportion of at least 0.1 part by weight per 100 parts by weight of Component A (block copolymer). In this case, if the proportion of Component C is smaller than 0.1 part by weight, Component A will not be modified and/or improved effectively.

As exemplary fibrous fillers useful as Component C in the invention, may be mentioned fibers such as glass fibers, carbon fibers, graphite fibers, silica fibers, alumina fibers, zirconia fibers, silicon carbide fibers and Aramid fibers; as well as whiskers such as potassium titanate whiskers, calcium silicate (including wollastonite) whiskers, calcium sulfate whiskers, carbon whiskers, silicon nitride whiskers and boron whiskers. Among these fibrous fillers, fibers such as glass fibers, carbon fibers and Aramid fibers are preferred from the viewpoints of physical properties and economy and of these, short fibers not longer than 10 cm are particularly preferred.

As exemplary inorganic fillers, may be mentioned talc, mica, kaolin, clay, silica, alumina, silica-alumina, titanium oxide, iron oxides, chromium oxide, calcium carbonate, calcium silicate, calcium phosphate, calcium sulfate, magnesium carbonate, magnesium phosphate, silicon, carbon (including carbon black), graphite, silicon nitride, molybdenum disulfide, glass, hydrotalcite, ferrite, samarium-cobalt, neodium-iron-boron, etc., all in a powder form.

These fibrous fillers and inorganic fillers may be used either singly or in combination.

[Component D . . . Basic Compound]

Addition of a specific basic compound to the composition of the present invention can reduce or prevent the melt viscosity increase or crystallinity reduction due to thermal modification and/or thermal deterioration, the sticking of thermal decomposition products at resin residence areas of melt processing equipment, etc. upon melt processing. In addition, these stabilizing effects will be enhanced further by combined use of the basic compound with a specific anti-oxidant.

As basic compounds, non-oxidative, heat-resistant and low volatile compounds, more specifically, the hydroxides, oxides and aromatic carboxylates of Group IIA metals of the periodic table other than magnesium, and aromatic carboxylates, carbonates, hydroxides, phosphates (including condensation products) and borates (including condensation products) of Group IA metals of the periodic table may be mentioned.

Among these basic compounds, the hydroxides and oxides of calcium and barium, as well as the lithium, sodium and potassium salts of aromatic carboxylic acids such as naphthalene monocarboxylic acid and polycarboxylic acids, arylbenzoic acids, benzene monocarboxylic acid and polycarboxylic acids and hydroxybenzoic acids are preferred. Among the above-exemplified basic compounds, the hydroxides of calcium and barium are particularly preferred.

The proportion of the basic compound in the composition of this invention is 0.1–30 parts by weight, preferably 0.2–25 parts by weight, more preferably 0.3–20 parts by weight, all, per 100 parts by weight of the poly(arylene thioether) block copolymer. If the proportion of the basic compound is smaller than 0.1 part by weight, its stabilizing effects cannot be exhibited to any sufficient degree. On the other hand any proportions greater than 30 parts by weight involve a potential problem that the block copolymer may be decomposed or electrical properties and the like may be deteriorated.

[Component E . . . Anti-oxidant]

As anti-oxidants used in combination with the basic compound, radical chain terminators and peroxide decomposers, more specifically, hindered phenolic compounds, phosphorus compounds and hindered amine compounds may be mentioned.

As exemplary hindered phenolic compounds, may typically be mentioned 1,3,5-trimethyl-2,4,6-tris-(3,5-di-t-butyl-4-hydroxybenzyl)benzene and compounds analogous thereto as well as octadecyl-3-(3,5-di-t-butyl-4-hydroxyphenyl)propionate, pentaerythrityltetrakis[3-(3,5-di-t-butyl-4-hydroxyphenyl)propionate] and 2,2-thio-diethylenebis[3-(3,5-di-t-butyl-4-hydroxyphenyl)-propionate].

As phosphorus compounds, those containing a trivalent phosphorus atom are preferred.

As typical examples of such trivalent phosphorus compounds, tris(2,4-di-t-butylphenyl)phosphite, bis-(2,6-di-t-butyl-4-methylphenyl)pentaerythritol diphosphite, distearylpentaerythritol diphosphite and tetrakis(2,4-di-t-butylphenyl) 4,4'-biphenylenediphosphinate may be mentioned.

As typical exemplary hindered amine compounds, poly{[6-(1,1,3,3-tetramethylbutyl)imino-1,3,5-triazin-2,4-diyl][(2,2,6,6-tetramethyl-4-piperidyl)imino]hexamethylene [(2,2,6,6-tetramethyl-4-piperydyl)imino} and compounds analogous thereto may be mentioned.

As anti-oxidants, low-volatile and decomposition-resistant ones, particularly, the above-described phosphorus compounds are preferred. These anti-oxidants may be used either singly or in combination. When used in combination, the combination of a radical chain terminator and a peroxide decomposer is preferred.

The proportion of the anti-oxidant in the composition of this invention is 0–10 parts by weight, preferably 0.05–5 parts by weight, more preferably 0.1–3 parts by weight, per 100 parts by weight of the poly(arylene thioether) block copolymer. If the proportion of the anti-oxidant is smaller than 0.05 part by weight, it cannot exhibit a sufficient stabilizing effect. On the contrary, any proportions greater than 10 parts by weight involve a potential problem that more gas components may be evolved and/or electrical properties and the like may be deteriorated.

[Optional Components]

Each thermoplastic resin composition of the present invention may optionally be added, as needed, with additives such as light stabilizers, rust inhibitors, lubricants, surface-roughening agents, nucleating agents, mold releasing agents, colorants, coupling agents, flashing preventives and/or antistatic agents.

Zinc compounds such as zinc oxide and zinc carbonate are particularly preferable as a scavenger for corrosive gas.

Blending Method

Compositions of the present invention can be prepared by various conventional blending methods including the blending of the individual components by a dry blending method.

Although all the components of the composition including optional components may be added simultaneously, they can also be blended in an arbitrary order. For instance, after Component A and Component D are blended in advance, the mixture thus-obtained is added with the other components.

Component A and Component D are blended in advance by a dry-blending method in which Component D in the form of a dry powder is added to Component A, or by a wet method in which Component D in a wet form such as a solution or a slurry is added to Component A and the solvent is then removed to dry the resultant mixture. These mixtures can be separately molten and kneaded further, as needed, to provide molten and kneaded mixtures. In this case, Component E may also be used jointly as desired.

When Component D is blended after addition of Component B and/or Component C to Component A, their blending may be carried out in the same manner as the above-described mixing method for Component D.

Dry blending method is preferred from the viewpoint that no drying step be required. (Formed and molded products)

The compositions of this invention can be formed or molded into various products by conventional melt-processing techniques.

Extruded molded products

Various extruded products can be obtained, for example, by charging a composition of this invention into an extruder equipped with a shaping die or nozzle in air or preferably in an inert gas atmosphere, extruding and shaping the block copolymer at a cylinder temperature of 300°–420° C. and an average intracylinder resin residence time of 0.5–60 minutes, preferably 2–30 minutes, and if necessary annealing the extrudates at 150°–350° C. for 0.1–100 hours.

Extruded products of this invention typically have the following physical properties and are thus excellent in heat resistance and strength.

(a) Heat distortion temperature (ASTM-D648, load: 18.6 kg/cm$^2$): at least 100° C.
(b) Tensile strength (ASTM-D638): at least 5 kg/mm$^2$ at 23° C.
(c) Tensile modulus in tension (ASTM-D638): at least 100 kg/mm$^2$ at 23° C.
(d) Solder heat resistance (60 sec): at least 200° C. preferably at least 230° C.

Incidentally, "solder heat resistance" is expressed by the highest solder temperature at which neither foaming nor deformation was developed when the extruded product was dipped in a solder bath for 60 seconds. The temperature of the solder bath was controlled in 5° C. increments.

Injection-molded products

Various injection-molded products can be obtained, for example, by charging a composition of this invention into an injection molding machine equipped with a mold in air or preferably in an inert gas atmosphere, injection-molding the block copolymer at a cylinder temperature of 300°–420° C., a mold temperature of 50°–230° C., an average intracylinder resin residence time of 1–3,000 seconds, preferably 3–1,000 seconds, an injection holding pressure of 10–10$^4$ kg/cm$^2$ and an injection cycle of 1–3,000 seconds, and if necessary annealing the thus-injected products at 150°–350° C. for 0.1–100 hours.

Injection-molded products of this invention have the following physical properties and thus, being excellent in heat resistance and strength.

(a) Heat distortion temperature (ASTM-D648, load: 18.6 kg/cm$^2$): at least 100° C.
(b) Flexural strength (ASTM-D790): at least 5 kg/mm$^2$ at 23° C.
(c) Flexural modulus (ASTM-D790): at least 100 kg/mm$^2$ at 23° C.
(d) Solder heat resistance (60 sec): at least 200° C. preferably at least 230° C.

Incidentally, "solder heat resistance" is expressed by the highest solder temperature at which foaming or deformation was not developed when the injection-molded product having about 3 mm thickness was dipped in a solder bath for 60 seconds. The temperature of the solder bath was controlled in 5° C. increments.

Unstretched films

Regarding the preferred proportions of the components for obtaining unstretched films, per 100 parts by weight of Component A, up to 100 parts by weight of Component B can be added whereas Component C can be added up to 50 parts by weight, preferably up to 25 parts by weight, more preferably up to 15 parts by weight per 100 parts by weight of the resin components (Component A + Component B); or the composition may additionally contain 0.1–10 parts by weight of Component D and 0–10 parts by weight of Component E. Here, either one of Component B and Component C should be blended in a proportion of at least 0.1 part by weight per 100 parts by weight of Component A.

An unstretched film can be obtained, for example, by charging a composition of this invention into an extruder equipped with a T-die in air or preferably in an inert gas atmosphere and melt-extruding it into a film-like shape (T-die process) or pressing the block copolymer into a film-like shape on a high-temperature press while heating it in a molten state (hot pressing) and if necessary, heat-setting the resultant film for 1–3,000 seconds at 160°–350° C. under a stress (pressure) while limiting distortions within ±20% and further heat-relaxing the heat-set film at 150°–340° C. for 1–3,000 seconds under substantially no stress.

It is also possible to obtain an unstretched film by subjecting the composition of the present invention to blown-film extrusion or compression molding. The composition of the present invention can also be combined with one or more other resins to form a multilayer film.

Incidentally, it is preferred that such extruder, injection-molding machine and T-die equipped extruder be made of a corrosion-resistant metal at portions where they may be brought into contact with the resin melt. Preferably, they should be vented.

Unstretched films of this invention usually have an average thickness of 0.5–5000 μm, preferably 1–3000 μm and typically have the following excellent physical properties:

(a) Tensile strength (ASTM-D638): at least 5 kg/mm$^2$ at 23° C.

(b) Tensile modulus (ASTM-D638): at least 100 kg/mm² at 23° C.
(c) Solder heat resistance (10 sec): at least 200° C. preferably at least 230° C.

Incidentally, "solder heat resistance" was expressed by the highest solder temperature at which changes in external appearance, such as swelling, wrinkling and shrinkage, were not developed when the unstretched film annealed for 30 minutes at 200° C. were immersed for 10 seconds in a solder bath. The temperature of the solder bath was controlled in 5° C. increments.

Other melt-formed or melt-molded products

From the compositions according to this invention, formed or molded hollow products such as bottles, tanks, pipes and tubes can be obtained by blow molding or the like. By pultrusion or the like, elongated products such as plates, pipes, rods and profiles can also be obtained from them.

(Application fields)

The block copolymers of the present invention permit the application of conventional melt processing techniques. They can be formed or molded into various heat-resistant products and can then be used in various fields. For example, extrusion products may include sheets, plates, pipes, tubes, covered conductors, etc. Injection-molded products may be used as electronic and electric parts, car parts, etc. On the other hand, unstretched films may be employed as base films for magnetic recording, capacitor films, printed circuit boards, insulating films, prepreg sheets, and so on.

Besides, compositions of the present invention can be used as heat-resistant and anti-corrosive coating agents, sizing agents for various fillers, hotmelt adhesives, sealants or the like without being processed.

ADVANTAGES OF THE INVENTION

The thermoplastic resin composition of this invention is a composition obtained by adding a high-crystalline crystalline block copolymer, which has high stability enough for permitting application of conventional melt processing techniques, has a sufficient molecular weight and is manufactured with an economical cost, with components which aim at quality change and improvement of the block copolymer. With the block copolymer composition as a raw material, various molded or formed products such as extruded products, injection-molded products or unstretched film, coating materials, sizing materials, adhesives, sealants or the like which have mechanical properties in practice and have a heat-resistant property can be manufactured with an economical cost.

In addition, the thermoplastic resin composition of the present invention is the composition improved in decrease of crystallinity, melt viscosity variation and the like, which take place due to thermal modification and thermal deterioration of the block copolymer upon melt processing. It has hence become feasible to prolong the long-run time of melt processing and to shorten the molding cycle time of injection molding, thereby making it possible to achieve a reduction in the cost of melt processing.

In addition, the degree of crystallization of a melt-molded or formed product has been increased. As a result, physical properties of the resulting molded or formed product, such as heat resistance and mechanical properties have been improved.

The sticking of thermal decomposition products to surfaces of a melt processing equipment, where the equipment is brought into contact with the molten resin, has been reduced, whereby the cleaning of a processing equipment has been rendered easy.

EMBODIMENTS OF THE INVENTION

The present invention will hereinafter be described in further detail by the following examples, experiments and comparative examples. It should however be borne in mind that the present invention is not limited only to the following examples and experiments so long as they do not depart from the spirit or scope of the invention.

[SYNTHESIS EXPERIMENT 1]

(Synthesis of block copolymer by Production Process No. 1)

(Synthesis of PATE prepolymer)

A titanium-lined reactor was charged with 225.5 kg of hydrated sodium sulfide (water content: 53.9 wt.%) and 500 kg of N-methylpyrrolidone (hereinafter abbreviated as "NMP"). While gradually heating the contents to 187° C. in a nitrogen gas atmosphere, 104 kg of an NMP solution, which contained 86.3 kg of water, and 34.9 moles of hydrogen sulfide were distilled out. Thereafter, 171.8 kg of p-dichlorobenzene (hereinafter abbreviated as "PDCB") and 167 kg of NMP was then fed, followed by polymerization at 220° C. for 10 hours (PDCB/sodium sulfide =0.9 mol/mol; water content/NMP =3 mol/kg).

After cooling to 50° C., a portion of the slurry of the reaction liquid containing the prepolymer was sampled out and the amount of active terminal groups was measured by the method which will be set out subsequently.

The concentration of terminal thiolate groups and terminal thiol groups was $462 \times 10^{-6}$ equivalent per gram of Prepolymer, while the concentration of terminal chlorine groups was $34 \times 10^{-6}$ equivalent per gram of prepolymer. The number average molecular weight of prepolymer as determined from the numbers of those terminal groups was 4032 (average polymerization degree: 37).

Analytical methods

<Analysis of terminal thiol groups or thiolate groups>

After completion of the polymerization of the prepolymer, a portion of the slurry as the reaction liquid was sampled out and then poured into water to have the polymer precipitated. The prepolymer was collected by filtration, washed in distilled water and then treated with dilute hydrochloric acid, whereby terminal thiolate groups were converted into thiol groups. The resulting polymer was washed for 30 minutes in distilled water and for additional 30 minutes in acetone and then dried at room temperature under reduced pressure in a vacuum drier, thereby obtaining a polymer sample. Right after that, about 10 mg to 1 gram of the polymer sample was weighed and placed in a stopper-equipped test tube, followed by the addition of 2.5 ml of an acetone solution consisting of 2.5 m; of acetone and 50 mmol of iodoacetamide. The test tube was hermetically closed and then heated at 100° C. for 60 minutes. The test tube was thereafter cooled with water and opened. The liquid-phase portion was separated. The absorbance at 450 nm (i.e., the absorbance of iodine) was measured by means of a spectrophotometer.

Using a calibration curve prepared in advance with respect to the thiol compound

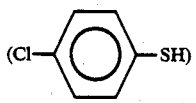

as a standard, the concentration of terminal thiol groups was calculated from the absorbance. (The amount of each sample should be chosen suitably so that the concentration of thiol groups in a corresponding acetone slurry falls within a range of 0.1–0.3 mol) analysis was conducted three times on the same dried sample to determine the average value of the concentration of terminal thiol groups.

<Analysis of terminal halogen groups>

Quantitative analysis of terminal halogen atoms was conducted using an X-ray fluorescence analyzer (model: "3080E2"; manufactured by Rigaku Denki Kabushiki Kaisha).

<Determination of number average molecular weight>

Each number average molecular weight was determined from the data of terminal thiol groups, including thiolate groups, and halogen groups in accordance with the following equation:

$$\text{Number average molecular weight} = \frac{\text{Sample weight (g)}}{\frac{1}{2}(\text{Number of terminal thiol groups} + \text{Number of terminal halogen groups})}$$

(Synthesis of block copolymer)

A titanium-lined reactor containing 957.4 kg of the reaction liquid slurry of the PATE prepolymer was charged with 29.8 kg of hydrated sodium sulfide (water content: 54.0 wt.%), 80.5 kg of 4,4'-dichlorobenzophenone (hereinafter abbreviated as "DCBP"), 328 kg of NMP and 127.8 kg of water. After the reactor being purged with nitrogen gas, the contents were heated to 260° C. at which they were polymerized for 2 hours.

The reaction conditions upon synthesis of the block copolymer were as follows:

(1) The molar ratio of the total amount of the charged dihalogenated aromatic compounds [the sum of the amount of PDCB charged upon synthesis of the prepolymer and the amount of DCBP charged upon synthesis of the block copolymer] to the total amount of the charged alkali metal sulfide [the sum of the amount of effective sodium sulfide charged upon synthesis of the prepolymer and the amount of sodium sulfide charged upon synthesis of the block copolymer] was 1.01.

(2) The ratio of the charged amount of DCBP to the amount of PDCB, charged upon synthesis of the prepolymer, was 32:68 by weight.

(3) The ratio of the water content to the organic amide (NMP) was about 10 mol/kg.

(Collection of block copolymer)

The resultant reaction mixture in the form of a slurry was diluted with a substantially equivalent of NMP and the granular polymer thus obtained was collected by a screen having an opening size of 150 μm (100 mesh). The polymer was washed three times with methanol and further three times with water, and then dried at 100° C. for 24 hours under reduced pressure to obtained a block copolymer $B_1$. The collection rate of the a block copolymer $B_1$ was 75%.

(Inherent properties of Block Copolymer)

The block copolymer $B_1$ was in the form of pearl-like granules having an average size of 680 μm and had a bulk density of 0.58 g/dl.

By an infrared (IR) spectrum analysis, a strong absorption peak attributed to ketone group was observed at 1640 $cm^{-1}$. Wide angle X-ray diffraction which was conducted using "RAD-B System" manufactured by Rigaku Denki Kabushiki Kaisha showed a diffraction pattern corresponding to the block copolymer, said pattern being apparently different from that corresponding PATE homopolymer or PTK homopolymer or a blend thereof.

The content of sulfur in Block Copolymer $B_1$ was determined by the combustion flask method and ion chromatography (IC method). Namely, Block Copolymer $B_1$ was caused to burn in a flask and the resulting combustion gas was absorbed in aqueous hydrogen peroxide solution, whereby the sulfur content of the block copolymer was converted into sulfate groups. The sulfur content was then quantitatively analyzed using an ion chromatographic apparatus equipped with an electrical conductivity detector ("IC-500"; manufactured by Yokogawa Electric Corporation).

The weight fraction $W_b$ (wt %) of the PATE recurring units

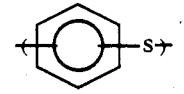

in the block copolymer can be calculated in accordance with the following equation:

$$W_b = 100 \times \frac{\text{Weight fraction of sulfur in block copolymer, } (W) - \text{Weight fraction of sulfur in PTK recurring unit, } (W_1)}{\text{Weight fraction of sulfur in PATE recurring unit, } (W_2) - \text{Weight fraction of sulfur in PTK recurring unit, } (W_1)}$$

By introducing a measured value W=24.3% and calculated values $W_1$=15.01% and $W_2$=29.63% into the above equation, $W_b$ was determined to be 63.5 %.

(Physical properties of block copolymer)

Physical properties of the block copolymer are as follows:
Melt viscosity: 180 poises
Transition temperature:
 Tg: 100° C.
 Tm: 302° C. and 323° C.
Melt crystallization temperature:
 Tmc (400° C.) 263° C.
 Tmc (400° C/10 min): 230° C.
Melt crystallization enthalpy:
 ΔHmc (400° C.): 53 J/g
Residual melt crystallization enthalpy
 ΔHmc (400° C./10 min): 42 J/g Incidentally, Tg (glass transition temperature) and Tm (melting point) were measured at a heating rate of 10° C./min from room temperature by a DSC using a pressed sheet (pressed at 380° C.) and powdery polymer as samples, respectively.

[SYNTHESIS EXPERIMENT 2]

(Synthesis of block copolymer by Production Process No. 2)

(Synthesis of PATE prepolymer)

A titanium-lined reactor was charged with 3.2 kg of hydrated sodium sulfide (water content: 53.7 wt.%) and 6.0 kg of NMP. While gradually heating the contents to 200° C. under a nitrogen gas atmosphere, 2.541 kg of an NMP solution containing 1.326 kg of water and 0.38 mole of hydrogen sulfide were distilled out. Then, 0.123 kg of water was added, followed by the feeding of a mixed solution of 2.35 kg of PDCB and 4.51 kg of NMP. Polymerization was conducted at 220° C. for 10 hours (PDCB/sodium sulfide =0.86 mol/mol, water content/NMP =about 3 mol/kg), thereby obtaining a reaction slurry containing a PATE prepolymer. The number average molecular weight of Prepolymer was 1530 (average polymerization degree: 14).

(Synthesis of PTK prepolymer)

A titanium-lined 20-l reactor was charged with 3.640 moles of DCBP, 2.039 moles of hydrated sodium sulfide (water content: 53.7 wt.%), 176 g of water and 4.004 kg of NMP. After the reactor being purged with nitrogen gas, the contents were maintained at 220° C. for 1 hour (water content/NMP =about 5 mol/kg) to obtain a reaction slurry containing a PTK prepolymer.

(Synthesis of block copolymer)

A charge pot equipped with a heater was mounted on the titanium-lined 20-l reactor with Reaction Slurry containing PTK Prepolymer(temperature of slurry: 220° C.). The pot was charged with 9.12 kg of Reaction Slurry containing PATE Prepolymer. After the Reaction Slurry being heated to 220° C., the reactor was charged with Reaction Slurry containing PATE Prepolymer and then with 1.146 kg of water. The contents were thereafter mixed.

The contents were maintained at 260° C. for 2 hours. After the contents being allowed to cool down to 240° C., a final stabilizing treatment of the reaction was effected by adding 0.4356 mole of DCBP and 0.5 kg of NMP and then reacting the contents at 240° C. for 0.2 hour. The reaction conditions upon synthesis of the block copolymer were as follows:

(1) The molar ratio of the total amount of the charged dihalogenated aromatic compounds [the sum of the amount of PDCB charged upon synthesis of PATE prepolymer and the amount of DCBP charged upon synthesis of PTK prepolymer] to the total amount of the charged alkali metal sulfide [the sum of the amount of sodium sulfide charged upon synthesis of PATE prepolymer and the amount of sodium sulfide charged upon synthesis of PTK prepolymer] was 0.99.

(2) The ratio of PATE blocks to PTK blocks was approximately 60:40 (weight ratio).

(3) The ratio of the water content to the amount of the charged organic amide (NMP) was about 10 mol/kg.

(Collection of block copolymer)

Collection was conducted in a similar manner to Synthesis Experiment 1, thereby obtaining a block copolymer B$_2$. The collection rate was 78%.

(Physical properties of block copolymer)

Physical properties of Block Copolymer B$_2$ were as follows:
Melt viscosity: 650 poises.
Transition temperature:
  Tg: 104° C.
  Tm: 301° C. and 324° C.
Melt crystallization temperature:
  Tmc (400° C.): 252° C.
  Tmc (400° C./10 min): 221° C.
Melt crystallization enthalpy:
  ΔHmc (400° C.): 43 J/g
Residual melt crystallization enthalpy
  ΔHmc (400° C./10 min): 36 J/g.

Incidentally, the ratio (weight ratio) of the sum of PATE recurring units to the sum of PTK recurring units was 1.6 (62/38).

[SYNTHESIS EXPERIMENT 3]

(Synthesis of melt-stable PTK)

A titanium-lined reactor was charged with 90 moles of DCBP, 90 moles of hydrated sodium sulfide (water content: 53.6 wt.%) and 90 kg of NMP (water content/NMP =5 mol/kg). After the reactor being purged with nitrogen gas, the contents were heated from room temperature to 240° C. over 1.5 hours and were then maintained at 240° C. for 2 hours to react them. Thereafter, to effect a stabilization treatment in a final stage of the reaction, 4.5 moles of DCBP, 18 kg of NMP and 90 moles of water were added, followed by a reaction at 240° C. for further 1 hour.

The rector was cooled and the reaction mixture in the form of a slurry was taken out of the reactor. The slurry was poured into about 200 l of acetone to have the resultant polymer precipitated. The thus-precipitated polymer was collected by filtration and washed twice with acetone and additionally twice with water. Acetone and water were removed to obtain the polymer in a wet form. The wet polymer thus obtained was dried at 100° C. for 12 hours under reduced pressure to obtain Polymer PTK-1 powder having an average particle size of 11.5 μm.

The melting point of that PTK-1 (powder) was 360° C.

As an index of the molecular weight of PTK, the solution viscosity of PTK-1 was measured.

Namely, the reduced viscosity $\eta_{red}$ of PTK-1 as measured at 25° C. by a Ubbelohde's viscometer after dissolving the PTK-1 at a concentration of 0.5 g/dl in 98% sulfuric acid was 0.63 dl/g.

As an index of the crystallinity of PTK, its density was measured.

Namely, PTK powder was first of all placed between two sheets of polyimide film ("Kapton", product of E.I.du Pont de Nemours & Co., Inc.). It was preheated at 385° C. for 2 minutes and then press-formed at 385° C. for 0.5 minute by a hot press. It was then quenched to obtain an amorphous sample whose thickness was about 0.15 mm.

In addition, the amorphous sample thus-obtained was annealed at 280° C. for 30 minutes to prepare an annealed sample with an increased degree of crystallinity. The densities of the amorphous sample and annealed sample (crystallized sample) measured at 25° C. by means of a density gradient tube of a [zinc chloride/water] system were 1.30 g/cm³ and 1.35 1 g/cm³ respectively.

With respect to the PTK-1 powder obtained in Synthesis Experiment, the residual melt crystallization enthalpy, ΔHmc (420° C./10 min) was measured as an index of its melt stability. Namely, the temperature corresponding to a peak of melt crystallization measured by the DSC is represented by Tmc (420° C./10 min), while a residual melt crystallization enthalpy, ΔHmc(420° C./10 min) was determined by converting the area of the peak.

Described specifically, about 10 mg of PTK-1 (powder) was weighed. After holding the PTK-1 at 50° C. for 5 minutes in an inert gas atmosphere, it was heated at a rate of 75° C./min up to 420° C. and held at that temperature for 10 minutes. While cooling the PTK-1 at a rate of 10° C./min thereafter, its Tmc (420° C./10 min) and ΔHmc (420° C./10 min) were measured. As the result, ΔHmc (420° C/10 min) and Tmc (420° C./10 min) were 43 J/g and 290° C., respectively.

Besides, ΔHmc (400° C./10 min) and Tmc (400° C./10 min) were 55 J/g and 313° C., respectively.

[EXAMPLE 1 AND COMPARATIVE EXAMPLE 1]

(Injection Molding Experiment)

A prescribed amount of the block copolymer $B_1$ obtained in Synthesis Experiment 1 and prescribed amounts of thermoplastic resins, fibrous filler and basic compound were dry-blended in a tumbler blender and then charged into a single-screw extruder having a cylinder diameter of 19 mm and an L/D ratio of 25. It was molten and kneaded at a cylinder temperature of 350° C. and thereafter extruded in the form of strands. The strands were quenched and then chopped to prepare [a pellet sample of the corresponding composition.

In the case of Examples 1-3, however, the pellet sample was prepared by changing the cylinder temperature to 370° C.

Each of pellet samples prepared in the above-described manner was charged into an injection molding machine under a nitrogen gas stream, and was then injection-molded at a cylinder temperature of 350° C., a mold temperature of 160° C., an injection holding pressure of 1000 kg/cm² and an injection cycle of about 40 seconds so that injection-molded products were obtained.

The pellets added with Ca(OH)$_2$ as a basic compound showed good long-run property.

The compositions and physical properties of the molded products are summarized in Table 1. It has been found that the strength, modulus of elasticity, heat resistance (heat distortion temperature and solder heat resistance), etc. of the molded products are improved by addition of fibrous fillers. Moreover, melt stability is improved by addition of Ca(OH)$_2$ as a basic compound.

Incidentally, the density of each molded product was determined by measuring the mass in air and that in water by means of an automatic gravimeter ("DENSIMETER-H"; manufactured by Toyo Seiki Seisku-sho, Ltd.) and also a balance.

In addition, "melt stability" was evaluated based on $\eta_{30}^*/\eta_5^*$ and $\eta_{60}^*/\eta_5^*$ obtained in the following manner. About 20 g of each pellet sample were placed in a barrel of Capirograph, which had been heated to 350° C.. The melt viscosity was measured 5 minutes, 30 minutes, 60 minutes later, thereby determining $\eta_5^*$, $\eta_{30}^*$ and $\eta_{60}^*$ (all, at a shear rate of 1200 sec$^{-1}$), respectively. The closer to 1 the ratio, the better the melt stability.

TABLE 1

| | | Example 1 | | | Comparative Example 1 | |
|---|---|---|---|---|---|---|
| Experiment No. | ASTM | 1-1 | 1-2 | 1-3 | R1-1 | R1-2 |
| Block copolymer $B_1$ (component A) (wt. parts) | | 100 | 100 | 50 | 100 | 0 |
| Thermoplastic resin (component B) (wt. parts) | | 0 | 0 | 50[1] | 0 | 100[2] |
| Fibrous filler[3] (component C) (wt. parts) | | 65 | 65 | 65 | 0 | 65 |
| Basic compound[4] (component D) (wt. parts) | | 0 | 0.5 | 0.5 | 0 | 0 |
| Flexural strength (23° C.) [kg/mm²] | D790 | 20 | 22 | 23 | 8 | 24 |
| Flexural modulus (23° C.) [kg/mm²] | D790 | 1450 | 1465 | 1500 | 320 | 1500 |
| Heat distortion temperature (18.6 kg/cm²) [°C.] | D648 | 283 | 280 | 282 | 145 | 272 |
| Solder heat resistance [°C.] (immersed for 60 seconds in solder bath) | | 285 | 285 | 285 | — | 260 |
| Density of injection-molded product (25° C.) [g/cm³] | | 1.66 | 1.66 | 1.66 | — | 1.67 |
| Melt stability (350° C.) | | | | | | |
| $\eta_{30}^*/\eta_5^*$ | | 1.5 | 0.85 | 0.82 | 1.2 | |
| $\eta_{60}^*/\eta_5^*$ | | 4.0 | 0.93 | 0.89 | 3.1 | |

[1]PATE: FORTRON W205 [Poly(p-phenylene thioether); product of Kureha Chemical Industry Co., Ltd.] ... 32.5 parts by weight  PTK : PTK-1 ... 17.5 parts by weight
[2]PATE FORTRON W214 [Poly(p-phenylene thioether); product of Kureha Chemical Industry Co., Ltd.]
[3]Glass fibers (product of Nippon Electric Glass Co., Ltd.; 13 μm diameter, 3 mm length)
[4]Ca(OH)$_2$

[EXAMPLE 2]

(Injection Molding Experiments)

A prescribed amount of the block copolymer $B_2$ obtained in Synthesis Experiment 2, a predetermined amount of a fibrous filler and a prescribed amount of a stabilizer composed in combination of a basic compound and an antioxidant were blended, pelletized and injection-molded in the same manner as in Example 1.

The proportions of the respective components and physical properties of injection-molded products are summarized in Table 2. Physical properties were measured under similar conditions to Example 1. With regard to the evaluation of melt stability of each composition, its melt viscosity was measured under the severer temperature conditions, i.e., at 370° C. in order to make clearer differences in melt stability among the individual compositions.

Combined use of a basic compound and an anti-oxidant as a stabilizer resulted in a composition of still improved melt stability compared with the single use of the basic compound. As a result, the long-run property was improved and in addition, sticking of decomposition products to processing equipment decreased, leading to improvements in molding machine cleanness.

[EXAMPLE 3 AND COMPARATIVE EXAMPLE 2)

(Injection Molding Experiments)

A prescribed amount of the block copolymer $B_1$ and a prescribed amount of various inorganic fillers were dry-blended, pelletized and injection molded in the same manner as in Example 1.

The proportions of the individual inorganic fillers and physical properties of the injection-molded products thus obtained are summarized in Table 3. It has been found that the modulus of elasticity is improved by the addition of an inorganic filler.

TABLE 3

| Experiment No. | ASTM | Example 3 3-1 | Example 3 3-2 | | Comparative Example 2 R2-1 |
|---|---|---|---|---|---|
| Block copolymer $B_1$ (wt. parts) | | 44 | 44 | | 100 |
| Inorganic filler | | $CaCO_3^1$ 33 | Talc$^2$ 16.5 $CaCO_3^1$ 16.5 | | — |
| Fibrous filler (wt. parts) | | $GF^3$ 33 | $GF^3$ 33 | | — |
| Flexural strength (23° C.) (kg/mm$^2$) | D790 | 17 | 13 | | 8 |
| Flexural modulus (23° C.) (kg/mm$^2$) | D790 | 1750 | 2050 | | 320 |

$^1$"Hakuenka CC"; product of Shiraishi Calcium Kaisha, Ltd.
$^2$"Micro Ace L-1"; product of Nippon Talc Co., Ltd.
$^3$Glass fibers, 13 μm diameter, 3 mm length (product of Nippon Electric Co., Ltd)

[EXAMPLE 4 AND COMPARATIVE EXAMPLE 3]

(Blending of the block copolymer with PTK and/or PATE)

Block copolymer $B_1$, PTK-1 obtained in Synthesis Experiment 3 and PATE [poly(p-phenylene thioether), "FORTRON #W214"; product of Kureha Co., Ltd.) were dry-blended at the weight ratios shown in Table 4 and pellet samples were prepared in a similar manner to Example 1 except that the temperature of the cylinder was changed to 370° C. Each pellet sample thus ob-

TABLE 2

| Experiment No. | ASTM | 2-1 | 2-2 | 2-3 | 2-4 | 2-5 | 2-6 | 2-7 |
|---|---|---|---|---|---|---|---|---|
| Block copolymer $B_2$(component A) (wt. parts) | | 100 | 100 | 100 | 100 | 100 | 100 | 100 |
| Fibrous filler$^1$(component C) (wt. parts) | | 67 | 67 | 67 | 67 | 67 | 67 | 67 |
| Basic compound (component D) (wt. parts) | | 0.5$^2$ | 1.0$^3$ | 0.5$^2$ | 1.0$^2$ | 1.0$^2$ | 1.0$^2$ | 1.0$^3$ |
| Antioxidant (component E) (wt. parts) | | 0 | 0 | 0.5$^4$ | 0.5$^4$ | 0.5$^5$ | 0.5$^6$ | 0.5$^6$ |
| Flexural strength (3° C.) [kg/mm$^2$] | D790 | 22 | 23 | 22 | 23 | 22 | 22 | 22 |
| Flexural modulus (23° C.) [kg/mm$^2$] | D790 | 1450 | 1500 | 1400 | 1450 | 1450 | 1450 | 1450 |
| Heat distortion temperature (18.6 mg/cm$^2$) [°C.] | D648 | 280 | 278 | 280 | 278 | 277 | 278 | 278 |
| Solder heat resistance [°C.] (immersed for 60 seconds in solder bath) | | 285 | 280 | 285 | 285 | 280 | 285 | 285 |
| Density of injection-molded product (25° C.) [g/cm$^3$] | | 1.66 | 1.66 | 1.66 | 1.66 | 1.66 | 1.66 | 1.66 |
| Melt stability (370° C.) | | | | | | | | |
| $n_{30}*/n_5*$ | | 1.5 | 1.5 | 1.2 | 1.1 | 1.1 | 1.1 | 1.2 |
| $n_{60}*/n_5*$ | | 5.0 | 5.5 | 2.5 | 2.0 | 2.5 | 3.2 | 3.0 |

$^1$Glass fibers (product of Nippon Electric Glass Co., Ltd., 13 μm diameter, 3 mm length.)
$^2$Ca(OH)$_2$
$^3$Li$_2$O$_3$
$^4$"MARK PEP-36";[product of Adeka Argus Chemical Co., Ltd.; Bis-(2,6-di-t-butyl-4-methylphenyl)-pentaerythritol diphosphite].
$^5$"IRGAFOS 168";[product of Ciba-Geigy AG.; Tris(2,4-di-t-butylphenyl)phosphite].
$^6$"MARK AO-220";[product of Adeka Argus Chemical Co., Ltd.; Compound analogous to 1,3,5-trimethyl-2,4,6-tris-(3,5-di-t-butyl-4-hydroxybenzyl)benzene].

tained was placed between two sheets of Kapton film (polyimide film produced by E.I.du Pont de Nemours & Co., Inc.), preheated at 370° C. for 2 minutes by a hot press and pressed and shaped at 370° C. for 0.5 minute. Then, the resultant sheet was quenched to prepare an amorphous sheet of about 0.15 mm. All the sheets obtained in the above manner were transparent.

The transition temperatures (glass transition temperature, crystallization temperatures from a glass state and also from molten state, and crystal melting points) of the respective sheets were measured by a DSC. The results are summarized in Table 4.

The glass transition temperature, crystallization temperatures and crystal melting point can be raised by blending the block copolymer with PTK. On the contrary, these transition temperatures can be reduced by blending PATE. In addition, it has been found from these transition temperatures that the block copolymer of this invention has a good compatibility with PTK and also with PATE.

TABLE 4

|  | Example 4 | | | | Comparative Example 3 | | |
|---|---|---|---|---|---|---|---|
| Experiment No. | 4-1 | 4-2 | 4-3 | 4-4 | R3-1 | R3-2 | R3-3 |
| Block copolymer $B_1$ (wt. %) | 40 | 80 | 60 | 30 | 100 | — | — |
| PTK - 1 (wt. %) | 60 | 20 | — | — | — | 100 | — |
| PATE[1] (wt. %) | — | — | 40 | 70 | — | — | 100 |
| Transition Temperature | | | | | | | |
| Glass transition temperature[2] (°C.) | 119 | 103 | 92 | 88 | 99 | 134 | 85 |
| Crystallization temperature (°C.) | | | | | | | |
| $TC_1$[3] | 160 | 151 | 132 | 131 | 145 | 168 | 128 |
| $TC_2$[4] | 286 | 263 | 232 | 229 | 238 | 312 | 228 |
| Crystal melting point[5] (°C.) | 325 | 297 | 278 | 276 | 288 | 349 | 277 |

[1]Poly(p-phenylene thioether) ("FORTRON W214"; product of Kureha Chemical Industry Co., Ltd.)
[2]and [3]Measured from glass state. Heated at 10° C. min.
[4]Measured from molten state. Measured at a cooling rate of 10° C./min after heated at 10° C./min to 400° C.
[5]After heating at 10° C./min to 400° C., cooled at 10° C./min to 30° C. and then determined by heating again at 10° C./min.

[EXAMPLE 5 AND COMPARATIVE EXAMPLE 4]

(Blending of the block copolymer with PTK and/or PATE)

A prescribed amount of Block Copolymer $B_1$, a prescribed amount of glass fibers (diameter: 13 μm, length: 3 mm, product of Nippon Denki Glass Co., Ltd.) and a prescribed amount of PATE or PTK-1 as a poly(p-phenylene thioether) were blended in a similar manner to Example 4 to prepare pellets. In addition, injection-molded products of each composition were prepared in a similar manner to Example 1. In the case of Comparative Example R4-2, however, the injection molded products were obtained by changing the cylinder temperature to 370° C.

The compositions and physical properties of the injection molded products are summarized in Table 5.

Blending of the block copolymer with PATE improved the mechanical strength of the block copolymer at room temperature, while blending of PATE with the block copolymer, the heat resistance of PATE was improved.

In addition, it has been found that the heat resistance of the block copolymer can be improved by blending PTK therewith.

TABLE 5

| Experiment No. | ASTM | Example 5 | | | | Comparative Example 4 | |
|---|---|---|---|---|---|---|---|
|  |  | 5-1 | 5-2 | 5-3 | 5-4 | R4-1 | R4-2 |
| Block copolymer $B_1$ (wt. parts) |  | 30 | 48 | 60 | 36 | — | — |
| Thermoplastic resin (wt. parts) |  | PTK-1 30 | PTK-1 12 | — | PATE[1] 24 | PATE[1] 60 | PTK-1 60 |
| Glass fibers[2] (wt. parts) |  | 40 | 40 | 40 | 40 | 40 | 40 |
| Flexural strength (23° C.) [kg/mm$^2$] | D790 | 21 | 20 | 20 | 24 | 26 | 20 |
| Flexural modulus (23°) [kg/mm$^2$] | D790 | 1570 | 1510 | 1470 | 1540 | 1500 | 1630 |
| Heat distortion temperature (18.6 kg/cm$^2$) [°C.] | D648 | 308 | 291 | 284 | 279 | 273 | 346 |
| Solder heat resistance[3] [°C.] (immersed for 60 seconds in solder bath) |  | 305 | 290 | 280 | 275 | 260 | 340 |

[1]Poly(p-phenylene thioether) (product of Kureha Chemical Industry Co., Ltd.; inherent viscosity $\eta_{inh}$: 0.48 as measured at 208° C. at a polymer concentration of 0.4 g/dl in 1-chloronaphthalene.)
[2]Glass fibers (product of Nippon Electric Glass Co., Ltd.; 13 μm diameter, 3 mm length.)
[3]Measured by a similar method to Example 1.

[EXAMPLE 6 AND COMPARATIVE EXAMPLE 5]

(Blending with liquid crystalline polyester)

A prescribed amount of Block Copolymer $B_1$ and a prescribed amount of a liquid crystalline polyester (hereinafter abbreviated as "LCP") were blended in a similar manner to Example 1 to prepare a pellet sample. At the same time, pellet samples were also prepared from Block Copolymer $B_1$ and LCP respectively in a similar manner. In a similar manner to Example 1 injection-molded products were prepared from those pellet samples and then annealed at 240° C. for 4 hours.

The proportions of LCP and physical properties of the injection-molded products are summarized in Table 6.

It has been found that blending with LCP improves the mechanical strength of the block copolymer at room temperature, and the anisotropy (the phenomenon that physical properties including flexural strength and flexural modulus largely differ between in the injection direction and in a direction perpendicular) of LCP, an inherent defect, is reduced by blending it with the block copolymer.

TABLE 6

| Experiment No. | ASTM | Example 6 | Comparative Example 5 | |
|---|---|---|---|---|
| | | | R5-1 | R5-2 |
| Block copolymer B$_1$ (wt. parts) | | 50 | 100 | — |
| LCP[1](wt. parts) | | 50 | — | 100 |
| Flexural strength[2] (23° C.) (kg/mm$^2$) | D790 | 14 | 8 | 15 |
| Flexural modulus[3] (23° C.) (kg/.mm$^2$) | D790 | 680 | 320 | 910 |
| Heat distortion temperature (18.6 kg/cm$^2$) (°C.) | D648 | 166 | 145 | 183 |
| Anisotropicity | — | low | non | high |

[1]Liquid crystalline polyester (VECTRA #A950; wholly aromatic LCP; product of CELANESE Corporation.)
[2]Measured in the injected direction.
[3]Measured in the injected direction.

[EXAMPLE 7 AND COMPARATIVE EXAMPLE 6]

(Blending with polyether imide)

Block Copolymer B$_1$ and a polyether imide (hereinafter abbreviated as "PEI"), which was an amorphous thermoplastic resin ("ULTEM 1000"; product of General Electric Company), were blended at the weight ratios shown in Table 7, respectively. Each of the compositions thus obtained was charged into a single-screw extruder having a cylinder diameter of 20 mm and a cylinder length of 50 cm and equipped with a nozzle of 2 mm in diameter, and was then molten and kneaded at a cylinder temperature of 370° C. to obtain strands. These strands were pulverized, molten and kneaded again in a similar manner to prepare a corresponding pellet sample.

For the sake of comparison, pellet samples were obtained from Block Copolymer B$_1$ and PEI, respectively in a similar manner.

Each of the pellet samples thus obtained was first of all placed between two sheets of polyimide film ("Kapton"; product of E.I. du Pont de Nemours & Co., Inc.). It was preheated at 370° C. for 2 minutes and then press-formed at 370° C. for 15 seconds by a hot press. It was then quenched to obtain an amorphous sheet whose thickness was about 0.15 mm. The transition temperatures of the amorphous sheet were measured by a DSC. The results are collectively shown in Table 7.

It has been found that by addition of PEI to the block copolymer, the glass transition temperature, which is an index of heat resistance and also dimensional stability increases with the amount of PEI blended and appears as a single peak. In addition, the crystallinity of the block copolymer was retained throughout the compositions.

The flowability of the blended composition upon pelletization was improved compared with that of PEI alone and its drawdown property was also improved compared with the block copolymer alone.

With regard to "melt processability" in Table 7, the flowability of melt of each resin or resin composition upon pelletization was observed and was subjected to a 4-stage evaluation in accordance with the following standard:
A: Excellent.
B: Good.
C: Slightly insufficient.
D: Poor.

TABLE 7

| Experiment No. | Example 7 | | | | Comparative Example 6 | |
|---|---|---|---|---|---|---|
| | 7-1 | 7-1 | 7-3 | 7-4 | R6-1 | R6-2 |
| Block copolymer B$_1$ (wt. parts) | 80 | 60 | 40 | 20 | 100 | — |
| PEI[1] (wt. parts) | 20 | 40 | 60 | 80 | — | 100 |
| Transition temperature | | | | | | |
| Glass transition temperature[2] (°C.) | 143 | 157 | 178 | 196 | 101[3] | 212 |
| Crystal melting point[4] (°C.) | 287 | 287 | 285 | 280 | 288 | N.D.[6] |
| Melt processability[5] Flowability | A | B | B | C | A | D |

[1]Polyether imide ("ULTEM 1000"; product of General Electric Co., Ltd.)
[2]After heating at 10° C./min to 400° C., cooled at 10° C./min to 30° C. and then determined by heating again at 10° C./min.
[3]Measured from glass state. Heated at 10° C./min.
[4]Measured under the same conditions as [2].
[5]The flowability upon preparation of pellets was observed.
A> B> C> D
Good← →Poor
[6]No peak was detected.

[EXAMPLE 8]

(Blending with polytetrafluoroethylene)

Block Copolymer B$_1$, polytetrafluoroethylene (hereinafter abbreviated as "PTFE") and glass fibers were blended in a tumbler blender. In a similar manner to Example 1, the resultant blends were separately pelletized and then injection-molded.

Physical properties of the injection-molded products thus obtained are as shown in Table 8. It has been found that addition of PTFE leads to an improved friction coefficient.

TABLE 8

| Experiment No. | | Example 8 | |
|---|---|---|---|
| | | 8-1 | 8-2 |
| Block copolymer B$_1$ | (wt. parts) | 55 | 55 |
| PTFE[1] | (wt. parts) | 0 | 15 |
| Glass fibers[2] | (wt. parts) | 30 | 30 |
| Coefficient of dynamic friction[3] | | 0.46 | 0.38 |

[1]Polytetrafluoroethylene, "TLP-10F-1"; product of Du pont-Mitsui Fluorochemicals.
[2]product of Nippon Electric Glass Co., Ltd.; 13 μm diameter 3 mm length.
[3]Suzuki's friction and abrasion testing machine. Counterpart material: S55C steel Pressure: 10 kg/cm$^2$ Speed: 30 cm/sec.

[EXAMPLE 9 AND COMPARATIVE EXAMPLE 7]

(Blending with PEEK)

Block Copolymer B$_1$ and PEEK ("Victrex PEEK 380P"; product of Imperial Chemical Industries, Ltd.) were blended at weight ratios of 25:75, 50:50 and 75:25, respectively. Each composition was molten and kneaded in a similar manner to Example 4, during which the state of extrusion was observed. The results are shown in Table 9.

In Table 9, the melt processability was subjected, like Example 7, to a 4-stage evaluation in accordance with the following standard:
A: Excellent.

B: Good.
C: Slightly insufficient.
D: Poor.

In addition, the tenacity of strands was determined by observing strands upon pelletization and then subjecting the results to a 3-stage evaluation in accordance with the following standard:
A: Excellent.
B: Good.
C: Slightly insufficient.

It is understood from Table 9 that the balance between melt flowability and the tenacity of strands can be improved by blending the block copolymer with PEEK.

one attributable to the block copolymer and the other to PES.

In Table 10, the melt processability was, like Example 7, subjected to a 4-stage evaluation in accordance with the following standard:
A: Excellent.
B: Good.
C: Slightly insufficient.
D: Poor.

Further, the tenacity of strands was determined by observing strands upon pelletization and then subjecting the results to a 3-stage evaluation in accordance with the following standard:
A: Excellent.
B: Good.
C: Slightly insufficient.

TABLE 9

|  |  | Example 9 | | | Comparative Example 7 | |
| --- | --- | --- | --- | --- | --- | --- |
| Experiment No. |  | 9-1 | 9-2 | 9-3 | R7-1 | R7-2 |
| Block copolymer $B_1$ | (wt. %) | 75 | 50 | 25 | 100 | – |
| PEEK[1] | (wt. %) | 25 | 50 | 75 | – | 100 |
| Melt processability |  |  |  |  |  |  |
| Flowability[2] |  | A | B | C | A | D |
| Property of extruded product |  |  |  |  |  |  |
| Tenacity of strands[3] |  | C | B | A | C | A |

[1]Polyetheretherketone ("Victrex PEEK 380P"; product of Imperial Chemical Industries, Ltd.
[2]The flowability upon preparation of pellets was observed. A> B> C> D Good← →Poor
[3]The strand upon preparation of pellets was observed. A> B> C ←Greater tenacity

[EXAMPLE 10 AND COMPARATIVE EXAMPLE 8]

(Blending with polyethersulfone)

Block Copolymer $B_1$ and a polyethersulfone (hereinafter abbreviated as "PES") ("PES 4100G"; product of Sumitomo Chemical Co., Ltd.) were blended at weight ratios of 30:70, 50:50 and 70:30, respectively. Each composition was molten and kneaded in a similar manner to Example 7. After an amorphous sheet was prepared, the transition temperatures of each sheet was measured. The results are shown in Table 10.

The balance between the flowability upon melting and kneading and the tenacity of strands were improved by blending the block copolymer with PES.

Even when their weight ratio is changed as described above, the crystallinity of the block copolymer is retained so that the crystallization temperatures ($TC_1$ and $TC_2$) can be controlled by the amount of PES to be blended.

In addition, two peaks were observed regarding the glass transition temperature of each resin composition,

TABLE 10

|  | Example 10 | | | Comparative Example 8 | |
| --- | --- | --- | --- | --- | --- |
| Experiment No. | 10-1 | 10-2 | 10-3 | R8-1 | R8-2 |
| Block copolymer $B_1$ (wt. parts) | 70 | 50 | 30 | 100 | – |
| PES[1] (wt. parts) | 30 | 50 | 70 | – | 100 |
| Transition temperature |  |  |  |  |  |
| Glass transition | 103 | 102 | 102 | 101 | – |
| temperature[2] (°C.) | 205 | 205 | 207 | – | 217 |
| Crystallization temperature |  |  |  |  |  |
| $TC_1^3$ (°C.) | 149 | 149 | 150 | 147 | – |
| $TC_2^4$ (°C.) | 230 | 226 | 221 | 235 | – |
| Crystal melting point[5] (°C.) | 288 | 287 | 287 | 288 | – |
| Melt processability |  |  |  |  |  |
| Flowability[6] | A | B | B/C | A | D |
| Property of extruded product |  |  |  |  |  |
| Tenacity of strands | C | B | A | C | A |

[1]Polyethersulfone ("PES 4100G"; product of SUMITOMO CHEMICAL CO., LTD.)
[2-5]Measured under the same conditions as in TABLE 4.
[6]The flowability upon preparation of pellets was observed A>B>C>D Good← →Poor
[7]The strands upon preparation of pellets was observed. A>B>C> ←Greater tenacity

[EXAMPLE 11 (EXTRUSION EXPERIMENT]

To 80 parts by weight of Block Copolymer $B_1$, 20 parts by weight of poly(p-phenylene thioether), 1 part by weight of silica powder and a prescribed amount of Ca(OH)$_2$ powder were added. They were dry-blended in a Henschel mixer, charged into a twin-screw extruder equipped with screws rotatable in the same direction and a nozzle of 5 mm across and having a cylinder diameter of 35 mm, molten and kneaded at a cylinder temperature of 350° C., extruded into strands, quenched and chopped. Pellet samples (Extrusion-1 and Extrusion-2) were thus obtained from the respective compositions.

The nozzle of the extruder was next replaced by a slit die. Pellet samples (Extrusion-1 and Extrusion 2) were separately fed, extruded into plates at a cylinder temperature or 350° C., quenched and thereafter cut, thereby obtaining plate-like extrudates respectively. The thus-quenched extrudates were subjected to annealing at 260° C. for 5 hours to obtain extruded products (annealed products).

Physical properties of the extruded and annealed products obtained respectively from the pellet samples (Extrusion-1 and Extrusion-2) are summarized in Table 11.

The long-run property of Ca(OH)$_2$-added pellets was good.

TABLE 11

| Experiment No. | ASTM | Example 11 | | | |
|---|---|---|---|---|---|
| | | Extrusion-1 | | Extrusion-2 | |
| Composition of pellets (wt. parts) | | Block copolymer B$_1$ | (80) | Block copolymer B$_1$ | (80) |
| | | PATE[1] | (20) | PATE | (20) |
| | | SiO$_2$ | (1) | SiO$_2$ | (1) |
| | | Ca(OH)$_2$ | (0) | Ca(OH)$_2$ | (0.5) |
| Properties of extruded products | | | | | |
| Density[2] (25° C.) [g/cm$^3$] | | 1.36 | | 1.36 | |
| Tensile strength (23° C.) [kg/cm$^2$] | D638 | 6 | | 6 | |
| Tensile modulus (23° C.) [kg/cm$^2$] | D638 | 210 | | 215 | |
| Remarks | | No stabilizer | | Ca(OH)$_2$ added to as a stabilizer[3] | |

[1]Poly(p-phenylene thioether) (product of Kureha Chemical Industry Co., Ltd.; inherent viscosity: 0.48 as measured at 208° C. at a polymer concentration of 0.4 g/dl in L-chloronaphthalene.)
[2]Measured using automatic gravimeter (DENSIMETER-H; Toyo Seiki Seisaku-Sho, Ltd.)
[3]Deposit of thermal decomposition products was not observed on the inner wall of the extruder.

[EXAMPLE 12]

(Preparation of unstretched films)

Pellet samples were prepared at the weight ratios indicated in Table 12 in a similar manner to Example 7 by using Block copolymer B$_2$, PTK-1 and PATE [poly(p-phenylene thioether), "FORTRON #W214"; product of Kureha Chemical Industry Co., Ltd.] as resin components.

Each of the pellet samples thus obtained was placed between two sheets of Kapton film (polyimide film produced by E. I. du Pont de Nemours & Company). It was preheated at 370° C. for 2 minutes and then press-formed at 370° C. for 0.5 minute by a hot press. It was then quenched to obtain a film whose thickness was about 0.15 mm. Each of the films thus obtained was sandwiched between two sheets of Kapton film, heat set at 280° C. for 2 minutes under pressure by using a hot press and then subjected to thermal relaxation at 270° C. for 2 minutes without pressure. Physical properties of the thus-obtained films are shown in Table 12. By the addition of the stabilizers, the long run property at the time of pellet preparation was improved so that the deposition of decomposition products to processing equipments was reduced.

TABLE 12

| Experiment No. | | ASTM | Example 12 | | |
|---|---|---|---|---|---|
| | | | 12-1 | 12-2 | 12-3 |
| Block copolymer B$_2$ | (wt. parts) | | 100 | 90 | 80 |
| PTK-1 | (wt. parts) | | 0 | 10 | 0 |
| PATE[1] | (wt. parts) | | 0 | 0 | 20 |
| Inorganic filler[2] | (wt. parts) | | 50 | 0 | 0 |
| Basic compound[3] | (wt. parts) | | 0 | 0.3 | 0.5 |
| Antioxidant[4] | (wt. parts) | | 0 | 0.2 | 0 |
| Tensile strength | (23° C.) (kg/mm$^2$) | D638 | 9 | 7 | 6 |
| Tensile modulus | (23° C.) (kg/mm$^2$) | D638 | 380 | 330 | 350 |
| Solder heat resistance (immersed for 10 seconds in solder bath) | (°C.) | | 280 | 280 | 270 |

[1]Poly(p-phenylene thioether) ("FORTRON W214"; product of Kureha Chemical Industry Co., Ltd.)
[2]CaCO$_3$("Hakuenka CC"; product of Shiraishi Calcium kaisha, Ltd.)
[3]Ca(OH)$_2$
[4]"MARK PEP-36"; (product of Adeka Argus Chemical Co., Ltd.)

We claim:

1. A melt-stable thermoplastic resin composition comprising:

(A) 100 parts by weight of a poly(arylene thioether) block copolymer (Component A) alternately comprising (X) at least one poly(arylene thioether-ketone) block having predominant recurring units of the formula

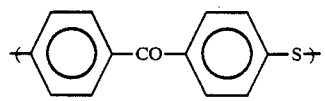

wherein the —CO— and —S— are in the para position to each other and (Y) at least one poly(arylene thioether) block having predominant recurring units of the formula

(a) the ratio of the total amount of the poly(arylene thioether) block (Y) to the total amount of the poly(arylene thioether-ketone) block (X) ranging from 0.05 to 5 by weight, (b) the average polymerization degree of the poly(arylene thioether) block (Y) being at least 10, and (c) said block copolymer having a melt viscosity of 2–100,000 poises as measured at 350° C. and a shear rate of 1,200/sec;

(B) 0–400 parts by weight of at least one of thermoplastic resins (Component B); and (C) 0–400 parts by weight of at least one filler (Component C) selected from fibrous fillers and inorganic fillers, per 100 parts by weight of the resin components, at least either one of Component B and Component C being contained in a proportion of at least 0.1 part by weight per 100 parts by weight of Component A.

2. The melt-stable thermoplastic resin composition as claimed in claim 1, wherein the poly(arylene thioether) block copolymer (Component A) has a melt crystallization temperature, Tmc (400° C./10 min) of at least 170° C. and a residual melt crystallization enthalpy, ΔHmc (400° C./10 min) of at least 10 J/g, wherein Tmc (400° C./10 min) and ΔHmc (400° C./10 min) are determined by a differential scanning calorimeter at a cooling rate of 10° C./min after the block copolymer is held at 50° C. for 5 minutes in an inert gas atmosphere, heated to 400° C. at a rate of 75° C./min and then held for 10 minutes at 400° C.

3. The melt-stable thermoplastic resin composition as claimed in claim 1, wherein the poly(arylene thioether) block (Y) in the poly(arylene thioether) block copolymer (Component A) has predominant recurring units of the formula

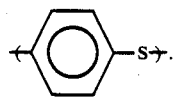

4. The melt-stable thermoplastic resin composition as claimed in claim 1, further comprising, per 100 parts by weight of the poly(arylene thioether) block copolymer (Component A), 0.1–30 parts by weight of at least one basic compound (Component D) selected from the group consisting of hydroxides, oxides and aromatic carboxylates of group IIA metals of the periodic table other than magnesium, and aromatic carboxylates, carbonates, hydroxides, phosphates, including condensation products, and borates, including condensation products, of group IA metals of the periodic table and 0–10 parts by weight of at least one anti-oxidant (Component E) selected from the group consisting of hindered phenolic compounds, phosphorus compounds and hindered amine compounds.

5. The melt-stable thermoplastic resin composition as claimed in claim 1, wherein the thermoplastic resin (Component B) is at least one polymer selected from poly(arylene thioether) having predominant recurring units of the formula

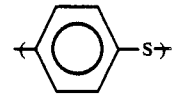

and poly(arylene thioether-ketone) having predominant recurring units of the formula

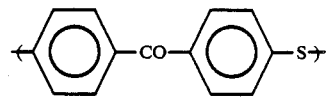

wherein the —CO— and —S— are in the para position to each other.

6. The melt-stable thermoplastic resin composition as claimed in claim 1, wherein the thermoplastic resin (Component B) is a liquid crystalline polyester.

7. The melt-stable thermoplastic resin composition as claimed in claim 1, wherein the thermoplastic resin (Component B) is a polYether imide.

8. The melt-stable thermoplastic resin composition as claimed in claim 1, wherein the thermoplastic resin (Component B) is polytetrafluoroethylene.

9. The melt-stable thermoplastic resin composition as claimed in claim 1, wherein the thermoplastic resin (Component B) is an aromatic polyetherketone.

10. The melt-stable thermoplastic resin composition as claimed in claim 1, wherein the thermoplastic resin (Component B) is an aromatic polysulfone.

11. The melt-stable thermoplastic resin composition as claimed in claim 1, wherein the fibrous filler (Component C) is at least one filler selected from the group consisting of glass fibers, carbon fibers and Aramid fibers.

12. A formed or molded product made of the melt-stable thermoplastic resin composition as claimed in claim 1.

13. The formed or molded product made of the melt-stable thermoplastic resin composition as claimed in claim 12, which is an extruded product, injection-molded product or an unstretched film.

14. The formed or molded product made of the melt-stable thermoplastic resin composition as claimed in claim 4.

15. The formed or molded product made of the melt-stable thermoplastic resin composition as claimed in claim 14, which is an extruded product, injection-molded product or an unstretched film.

* * * * *